United States Patent
Huscher

(10) Patent No.: US 11,560,833 B2
(45) Date of Patent: *Jan. 24, 2023

(54) WASTE HEAT RECOVERY SYSTEM WITH NOZZLE BLOCK INCLUDING GEOMETRICALLY DIFFERENT NOZZLES AND TURBINE EXPANDER FOR THE SAME

(71) Applicant: BorgWarner Inc., Auburn Hills, MI (US)

(72) Inventor: Frederick Michael Huscher, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/488,549

(22) Filed: Sep. 29, 2021

(65) Prior Publication Data

US 2022/0018281 A1 Jan. 20, 2022

Related U.S. Application Data

(63) Continuation of application No. 16/282,854, filed on Feb. 22, 2019, now Pat. No. 11,156,152.
(Continued)

(51) Int. Cl.
*F02B 41/10* (2006.01)
*F01N 5/04* (2006.01)
(Continued)

(52) U.S. Cl.
CPC ............ *F02B 41/10* (2013.01); *F01D 9/04* (2013.01); *F01D 9/047* (2013.01); *F01D 17/105* (2013.01);
(Continued)

(58) Field of Classification Search
CPC .......................... F01D 17/14–18; F01D 9/047
See application file for complete search history.

(56) References Cited

U.S. PATENT DOCUMENTS

| | | |
|---|---|---|
| 700,744 A | 5/1902 | Curtis |
| 740,332 A | 9/1903 | Stumpf |
| | (Continued) | |

FOREIGN PATENT DOCUMENTS

| | | |
|---|---|---|
| CH | 507446 A | 5/1971 |
| CN | 101091041 A | 12/2007 |
| | (Continued) | |

OTHER PUBLICATIONS

English language abstract and machine-assisted English translation for DE 10 2012 211 578 A1 extracted from espacenet.com database on Jun. 16, 2021, 15 pages.
(Continued)

*Primary Examiner* — Laert Dounis
(74) *Attorney, Agent, or Firm* — Howard & Howard Attorneys PLLC

(57) ABSTRACT

A waste heat recovery system for recovering waste heat of in internal combustion engine includes a turbine expander. The turbine expander includes a turbine blade, a shaft coupled to and rotatable by the turbine blade, and a nozzle assembly. The nozzle assembly includes a nozzle block disposed about the shaft and adjacent the turbine blade, a first nozzle component coupled to the nozzle block, and a second nozzle component coupled to the nozzle block. The first nozzle component defines a first nozzle having a first geometrical configuration. The second nozzle component defines a second nozzle having a second geometrical configuration that is different from the first geometrical configuration. The waste heat recovery system also includes a flow control device in fluid communication with the turbine
(Continued)

expander. The waste heat recovery system further includes a controller in communication with the flow control device.

19 Claims, 12 Drawing Sheets

Related U.S. Application Data

(60) Provisional application No. 62/635,858, filed on Feb. 27, 2018.

(51) Int. Cl.
*F01D 17/18* (2006.01)
*F02G 5/02* (2006.01)
*F01D 9/04* (2006.01)
*F01D 17/10* (2006.01)

(52) U.S. Cl.
CPC ............... *F01D 17/18* (2013.01); *F01N 5/04* (2013.01); *F02G 5/02* (2013.01); *F05D 2220/60* (2013.01); *F05D 2250/51* (2013.01); *Y02T 10/12* (2013.01)

(56) References Cited

U.S. PATENT DOCUMENTS

| | | | |
|---|---|---|---|
| 1,985,404 | A | 12/1934 | Dahlstrand |
| 4,066,381 | A | 1/1978 | Earnest |
| 4,097,188 | A | 6/1978 | Forster |
| 4,325,670 | A | 4/1982 | Silvestri, Jr. |
| 5,383,763 | A | 1/1995 | Henkelmann |
| 6,416,277 | B1 | 7/2002 | Manges, Jr. |
| 11,015,489 | B1 | 5/2021 | Huscher et al. |
| 2010/0047064 | A1 | 2/2010 | Mokulys et al. |
| 2011/0056203 | A1 | 3/2011 | Gartner et al. |
| 2011/0179793 | A1 | 7/2011 | Stegmaier et al. |
| 2012/0260654 | A1 | 10/2012 | Proepper |
| 2013/0058772 | A1 | 3/2013 | Hasemann et al. |
| 2013/0205783 | A1 | 8/2013 | Krinn et al. |
| 2015/0086346 | A1 | 3/2015 | Mueller et al. |
| 2017/0145865 | A1 | 5/2017 | Huscher |
| 2019/0264606 | A1 | 8/2019 | Huscher |

FOREIGN PATENT DOCUMENTS

| | | | |
|---|---|---|---|
| DE | 3242713 | A1 | 6/1983 |
| DE | 10 2012 211 578 | A1 | 1/2014 |
| DE | 102012211578 | A1 | 1/2014 |
| DE | 10 2012 211 578 | B4 | 2/2015 |
| DE | 102012211578 | B4 | 2/2015 |
| FR | 318433 | A * | 10/1902 |
| FR | 331 950 | | 10/1903 |
| FR | 331950 | A | 10/1903 |
| FR | 344 683 | | 11/1904 |
| FR | 344683 | A | 11/1904 |
| GB | 1280763 | A | 7/1972 |
| JP | 2014-206085 | | 10/2014 |
| JP | 2014206085 | A | 10/2014 |
| WO | 2006026133 | A2 | 3/2006 |
| WO | 2013184042 | A2 | 12/2013 |
| WO | WO 2013/184042 | | 12/2013 |

OTHER PUBLICATIONS

English language abstract and machine-assisted English translation for DE 10 2012 211 578 B4 extracted from espacenet.com database on Jun. 16, 2021, 15 pages.

Partial machine-assisted English translation for FR 331 950 extracted from espacenet.com database on Nov. 13, 2019, 3 pages.

Partial machine-assisted English translation for FR 344 683 extracted from espacenet.com database on Nov. 13, 2019, 5 pages.

English language abstract and machine-assisted English translation for JP 2014-206085 extracted from espacenet.com database on Apr. 4, 2019, 20 pages.

English language abstract and machine-assisted English translation for WO 2013/184042 extracted from espacenet.com database on Apr. 4, 2019, 25 pages.

Machine-assisted English translation for CH 507446 A extracted from espacenet.com database on Oct. 4, 2021, 5 pages.

English language abstract and machine-assisted English translation for DE 3242713 A1 extracted from espacenet.com database on Oct. 4, 2021, 9 pages.

English language abstract and machine-assisted English translation for CN 101091041 A extracted from espacenet.com database on Sep. 29, 2022, 17 pages.

* cited by examiner

WASTE HEAT RECOVERY SYSTEM WITH NOZZLE BLOCK INCLUDING GEOMETRICALLY DIFFERENT NOZZLES AND TURBINE EXPANDER FOR THE SAME

CROSS-REFERENCE TO RELATED APPLICATIONS

The present application is a Continuation of patent application Ser. No. 16/282,854 filed on Feb. 22, 2019, which claims priority to and all the benefits of U.S. Provisional Application No. 62/635,858 filed on Feb. 27, 2018, which is hereby expressly incorporated herein by reference in its entirety.

BACKGROUND OF THE INVENTION

1. Field of the Invention

The present invention relates generally to a waste heat recovery system for recovering waste heat of an internal combustion engine.

2. Description of the Related Art

Internal combustion engines (ICEs) produce thrust and/or power during operation and release heat as a byproduct. In the automotive industry, waste heat recovery systems typically utilize this discarded heat to produce electricity that may further be used to power electronic components of a motor vehicle.

Conventional waste heat recovery systems include a turbine expander, a flow control device, and a controller. The turbine expander outputs power based on a working fluid. Specifically, in conventional waste heat recovery systems, the turbine expander includes a turbine blade that is rotatable by the working fluid, a shaft coupled to and rotatable by the turbine blade and extending along a longitudinal axis, and a nozzle assembly for directing the working fluid to the turbine blade for rotating the turbine blade.

Conventional nozzle assemblies have a nozzle block, a first nozzle component, and a second nozzle component. The nozzle block is disposed about the shaft and is adjacent the turbine expander. The first nozzle component is integral with nozzle block for accelerating the working fluid and defines a first nozzle, and the second nozzle component is integral with the nozzle block for accelerating the working fluid and defines a second nozzle. In conventional nozzle components, the first and second nozzles have the same geometrical configuration.

Conventional waste heat recovery systems utilize an organic Rankine cycle (ORC). An ORC is named for its use of an organic, high molecular mass working fluid with a liquid-vapor phase change occurring at a lower temperature than a water-steam phase change. The working fluid may include at least one of ethanol, methanol, kerosene, gasoline, diesel, propanol, butanol, water, benzene, toluene, methane, ethane, propane, butane, acetone, or liquid hydrogen. Heat discarded by the ICE heats the working fluid so that the working fluid undergoes liquid-vapor phase change from a liquid state to a vapor state. In the vapor state, the working fluid is more suitable for rotating the turbine blade.

In recent years, there has been a desire to increase the efficiency and overall performance of waste heat recovery systems. There has been a desire to expand the operating range and improve the controllability to help increase the efficiency and overall performance of waste heat recovery systems. For conventional waste heat recovery systems, the working fluid must flow at an appropriate pressure and mass flow rate to rotate the turbine blade.

However, in conventional waste heat recovery systems where the first and second nozzles have the same geometrical configuration, there is only a narrow window of working fluid pressure and mass flow rate in which the waste heat recovery system is operable. Specifically, heat produced by the ICE varies based on the speed and load of the ICE. As such, at certain operating states of the ICE (e.g. start-up), heat produced by the ICE may render the working fluid pressure and mass flow rate outside the narrow window within which the waste heat recovery system is operable. When the working fluid is outside the narrow window of pressure and mass flow rate, the working fluid must bypass the turbine expander or the turbine expander must be shut-off to prevent working fluid condensation damage to the turbine blade.

Additionally, conventional nozzle assemblies are difficult to manufacture. Specifically, defining nozzles in nozzle components that are integral with the nozzle block requires extensive, precise machining due to the size of the nozzle block, which increases manufacturing time and cost.

As such, there remains a need to provide an improved a waste heat recovery system.

SUMMARY OF THE INVENTION AND ADVANTAGES

A waste heat recovery system for recovering waste heat of in internal combustion engine includes a turbine expander for outputting power based on a working fluid. The turbine expander includes a turbine blade rotatable by the working fluid, a shaft coupled to and rotatable by the turbine blade and extending along a longitudinal axis, and a nozzle assembly for directing the working fluid to the turbine blade for rotating the turbine blade. The nozzle assembly includes a nozzle block disposed about the shaft and adjacent the turbine blade, a first nozzle component coupled to the nozzle block for accelerating the working fluid, and a second nozzle component coupled to the nozzle block for accelerating the working fluid. The first nozzle component defines a first nozzle having a first geometrical configuration. The second nozzle component defines a second nozzle having a second geometrical configuration that is different from the first geometrical configuration. The waste heat recovery system also includes a flow control device in fluid communication with the turbine expander for directing the working fluid to at least one of the first and second nozzles or to bypass the turbine expander. The waste heat recovery system further includes a controller in communication with the flow control device and adapted to control the flow control device to direct the working fluid to at least one of the first and second nozzles or to bypass the turbine expander.

A waste heat recovery system for recovering waste heat of in internal combustion engine includes a turbine expander for outputting power based on a working fluid. The turbine expander includes a turbine blade rotatable by the working fluid, a shaft coupled to and rotatable by the turbine blade and extending along a longitudinal axis, and a nozzle assembly for directing the working fluid to the turbine blade for rotating the turbine blade. The nozzle assembly includes a nozzle block disposed about the shaft and adjacent the turbine blade, with the nozzle block defining a bore. The nozzle assembly also includes a nozzle component removably coupled to the nozzle block such that the nozzle component is selectively disposed in the bore for accelerating the working fluid. The nozzle component defines a nozzle. The waste heat recovery system also includes a flow control device in fluid communication with the turbine expander for directing the working fluid to the nozzle or to bypass the turbine expander. The waste heat recovery system further includes a controller in communication with the flow control device and adapted to control the flow control device to direct the working fluid the nozzle or to bypass the turbine expander. The turbine expander as described above, wherein at least a portion of the nozzle block may be disposed between the nozzle and the turbine blade.

Accordingly, the waste heat recovery system having first and second nozzles that have different geometrical configurations allows for the working fluid to pass through each of the first and second nozzles at different working fluid pressures and mass flow rates, thereby expand the operating range of the waste heat recovery system. Also, the first and second nozzles provide a series of incremental steps for working fluid pressures and mass flow rates that allows for greater controllability of the waste heat recovery system. Additionally, the waste heat recovery system having a nozzle component that is removably coupled to the nozzle block reduces manufacturing complexity of the waste heat recovery system. Specifically, the nozzle of the nozzle component may be machined independently of the nozzle block, thereby reducing manufacturing time and manufacturing costs.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
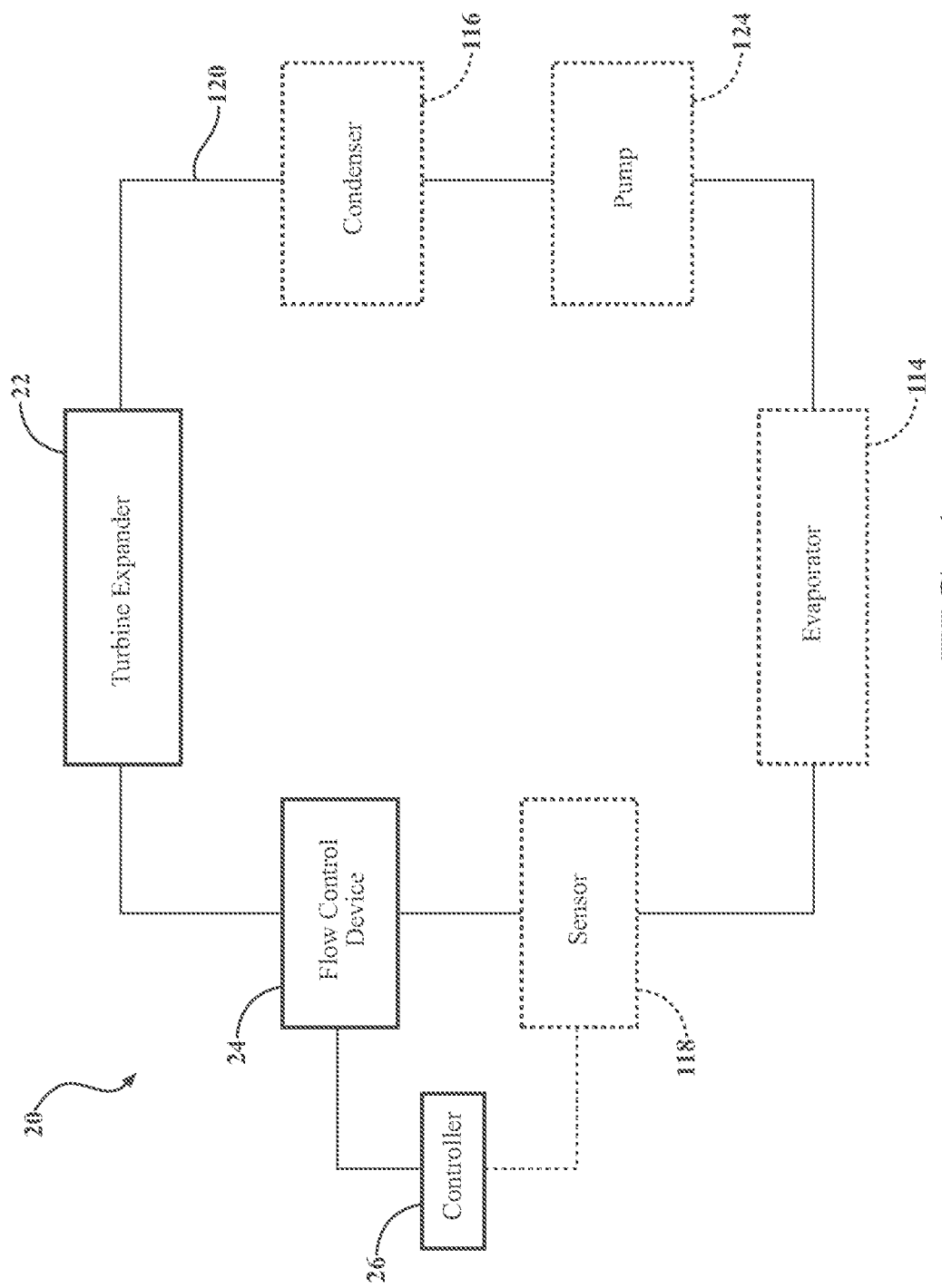
FIG. 1 is a schematic illustration of a waste heat recovery system including a turbine expander, a flow control device, a controller, an evaporator, a condenser, a sensor, and a pump.

With reference to the Figures, wherein like numerals indicate like parts throughout the several views, a waste heat recovery system 20 for recovering waste heat of an internal combustion engine (ICE) is schematically shown in FIG. 1. The waste heat recovery system 20 includes a turbine expander 22 for outputting power based on a working fluid, a flow control device 24 in fluid communication with the turbine expander 22, and a controller 26 in communication with the flow control device 24.

Figure 2:
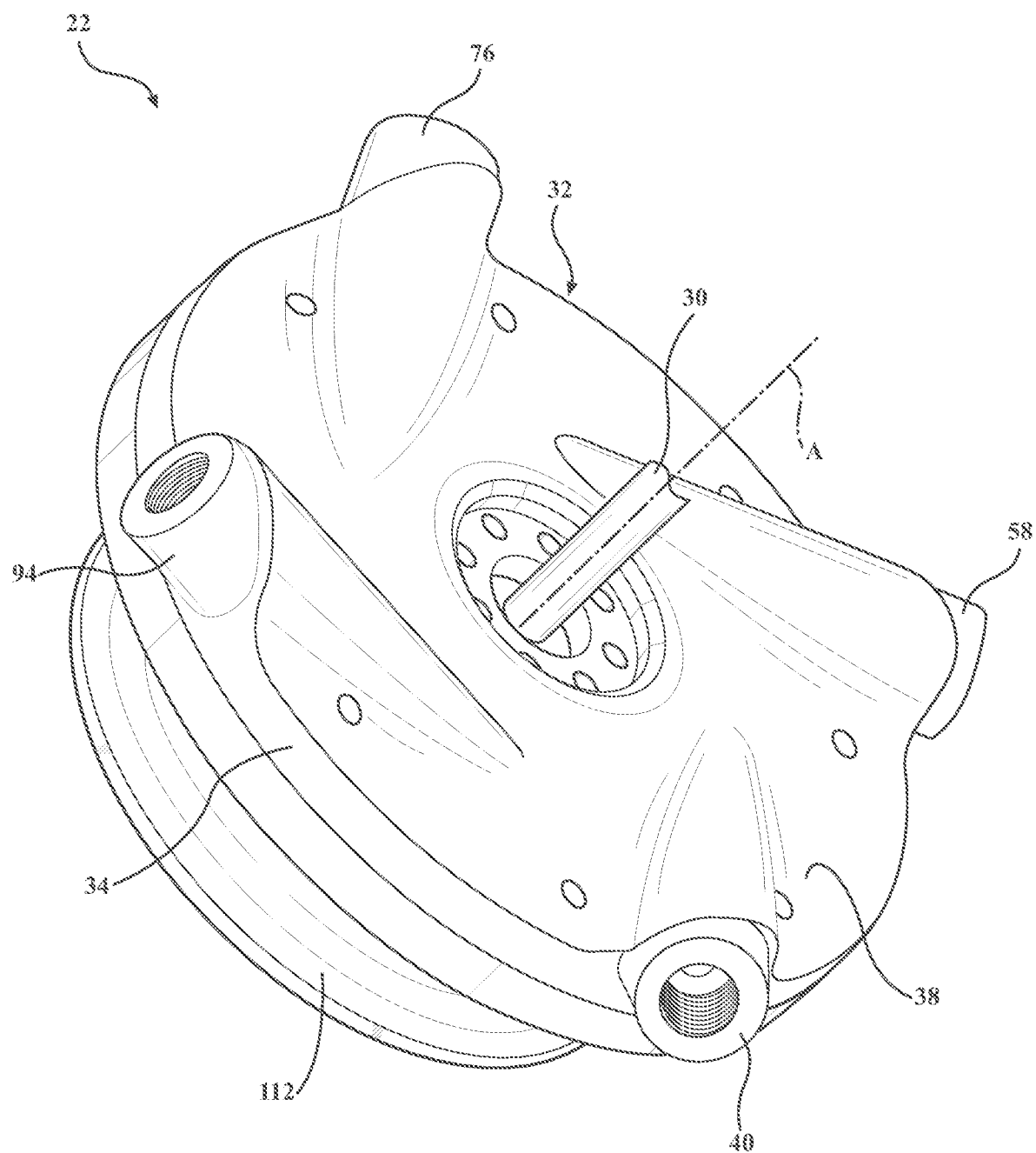
FIG. 2 is a perspective view of the turbine expander.
Figure 3:
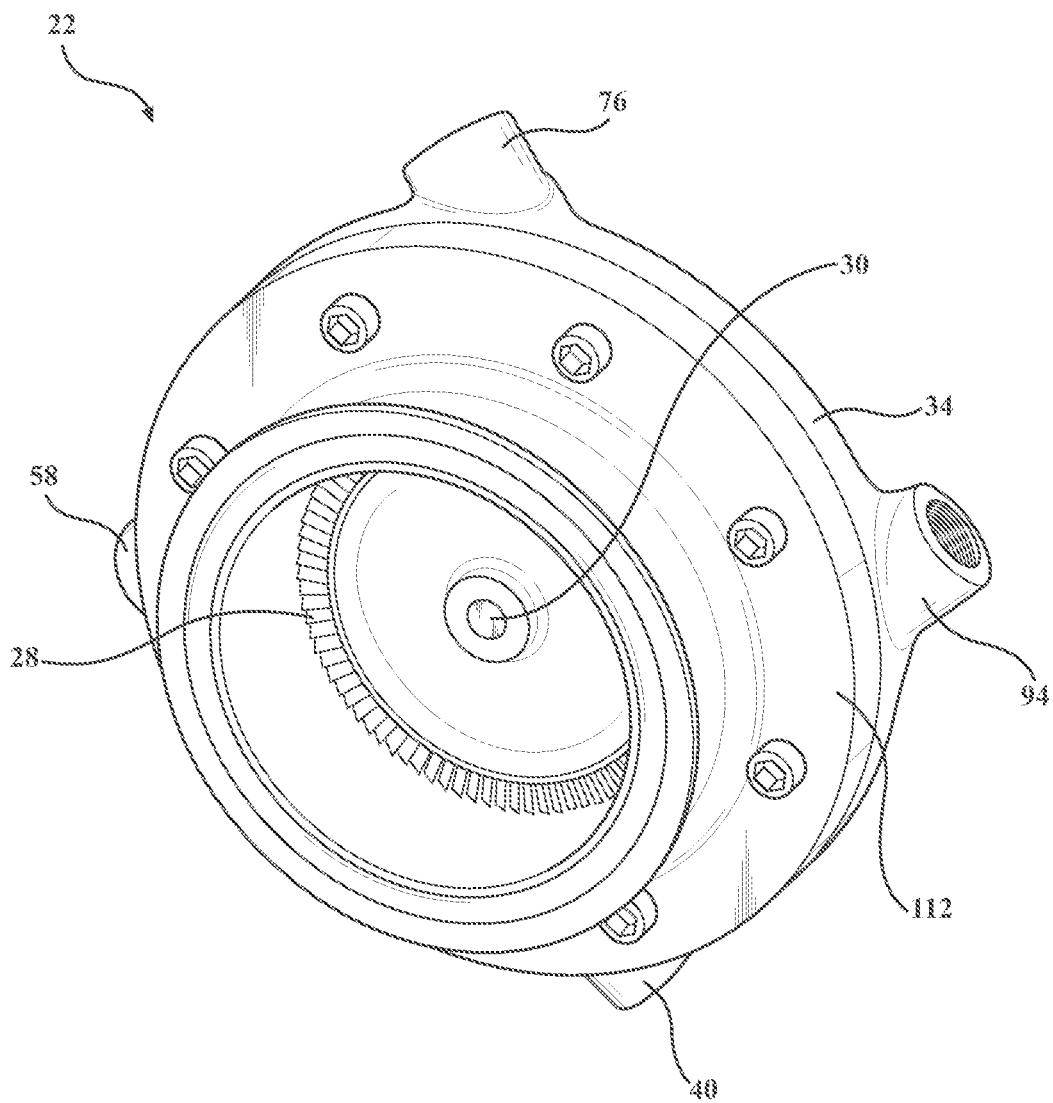
FIG. 3 is a perspective view of the turbine expander of FIG. 2, with the turbine expander including a turbine blade rotatable by the working fluid, a shaft coupled to and rotatable by the turbine blade, and a nozzle assembly for directing the working fluid to the turbine blade for rotating the turbine blade.

With reference to FIG. 3, the turbine expander 22 includes a turbine blade 28 rotatable by the working fluid. As best shown in FIG. 2, the turbine expander 22 also includes a shaft 30 coupled to and rotatable by the turbine blade 28. The shaft 30 extends along a longitudinal axis A. The working fluid causes rotation of the turbine blade 28 about the longitudinal axis A of the shaft 30.

Figure 4:
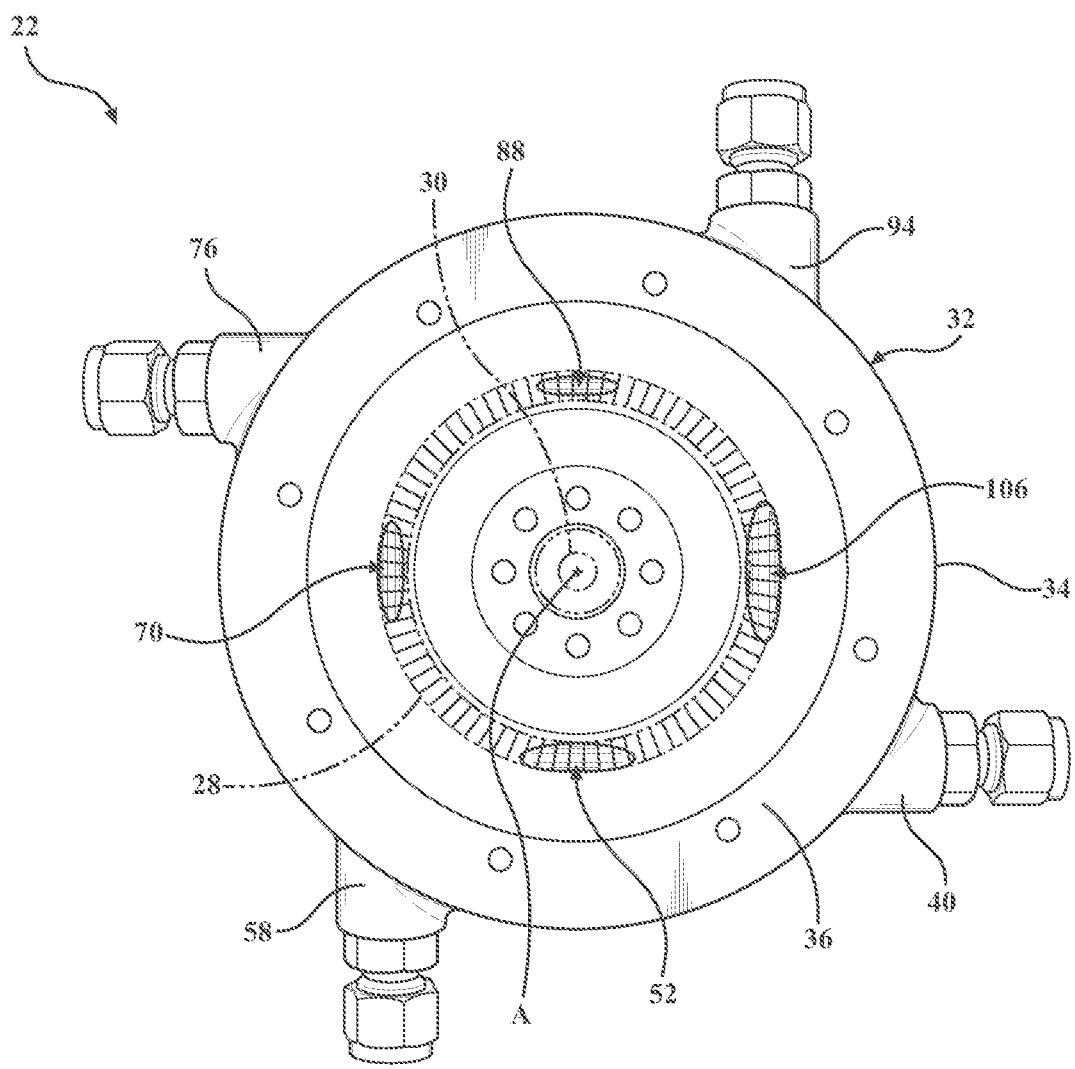
FIG. 4 is a top view of the turbine expander of FIG. 2 with a turbine housing removed and the turbine blade and the shaft shown in phantom.

With continued reference to FIG. 2, the turbine expander 22 further includes a nozzle assembly 32 for directing the working fluid to the turbine blade 28 for rotating the turbine blade 28. The nozzle assembly 32 includes a nozzle block 34 disposed about the shaft 30 and adjacent the turbine blade 28. Typically, the nozzle block 34 has an annular configuration. However, the nozzle block 34 may have any configuration suitable for directing the working fluid to the turbine blade 28. The nozzle block 34 may have a first face 36 facing the turbine blade 28, as best shown in FIG. 4, and a second face 38 facing opposite the first face 36, as best shown in FIG. 2.

Figure 5:
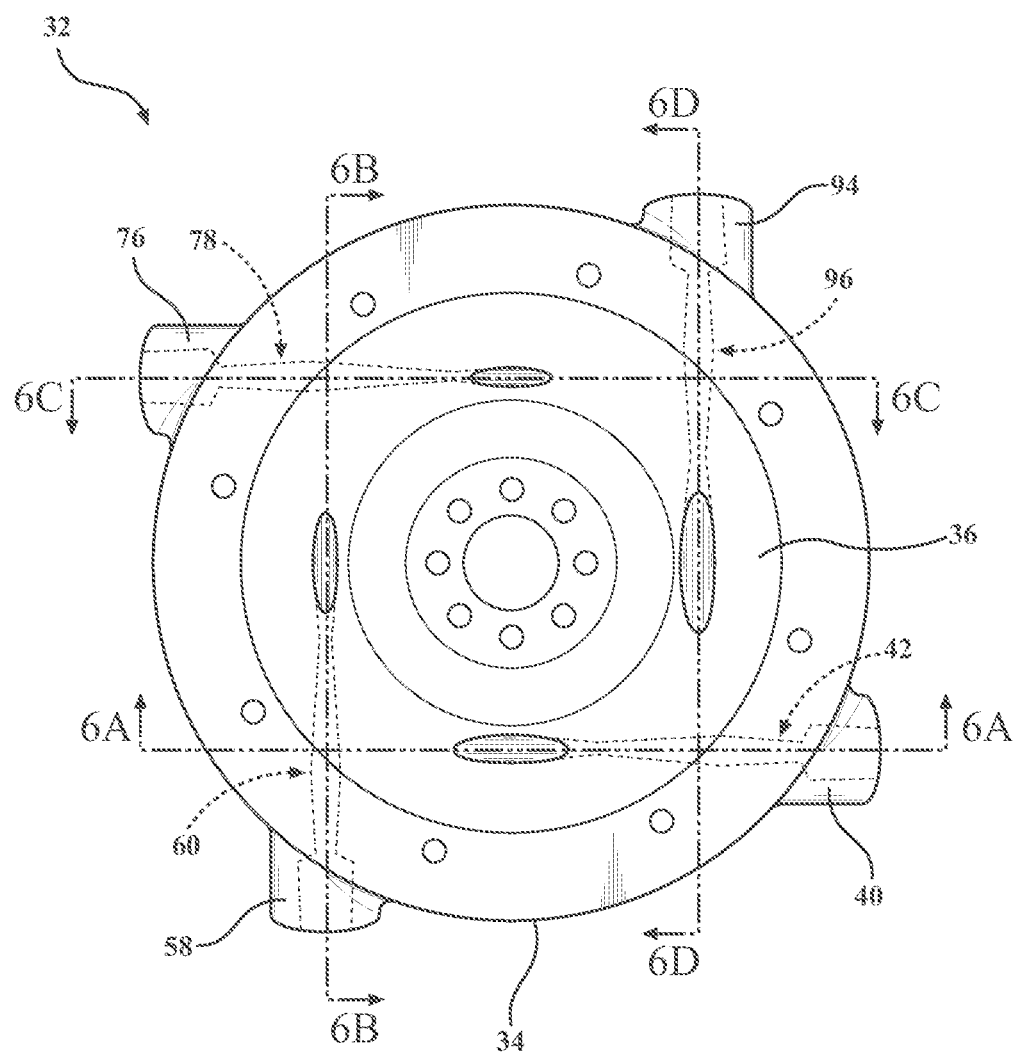
FIG. 5 is a top view of the nozzle assembly of FIGS. 2-4, with the nozzle assembly including a nozzle block, a first nozzle component coupled to the nozzle block and defining a first nozzle shown in phantom, a second nozzle component coupled to the nozzle block and defining a second nozzle shown in phantom, a third nozzle component coupled to the nozzle block and defining a third nozzle shown in phantom, and a fourth nozzle component coupled to the nozzle block and defining a fourth nozzle shown in phantom.
Figure 6A:
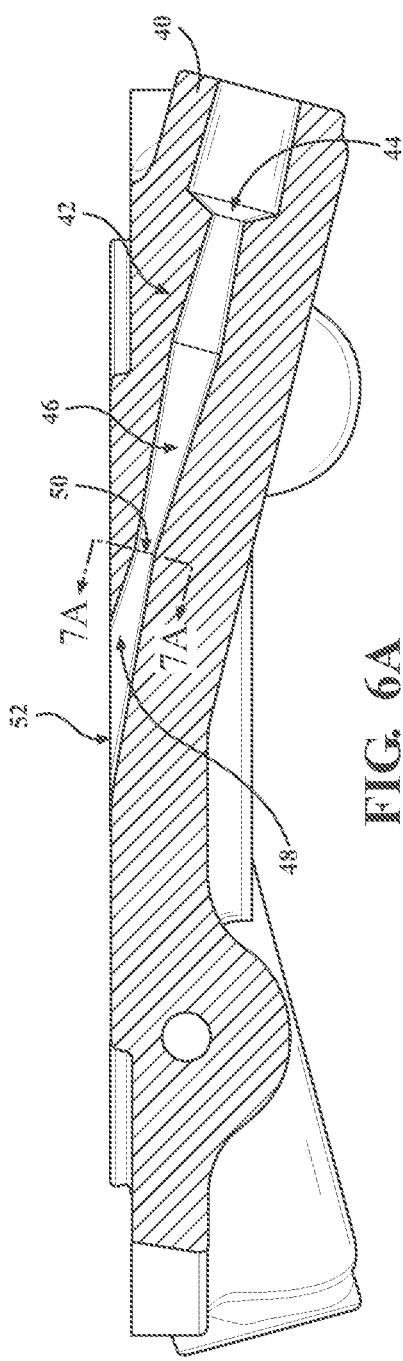
FIG. 6A is a cross-sectional view of the first nozzle component taken along line 6A-6A of FIG. 5.

With continued reference to FIG. 2, the nozzle assembly 32 also includes a nozzle component 40 coupled to the nozzle block 34 for accelerating the working fluid. As shown in FIGS. 5 and 6A, the nozzle component 40 defines a nozzle 42. In one embodiment, the nozzle component 40 is integral (i.e., one-piece) with the nozzle block 34, as shown in FIG. 2. In another embodiment, as described in further detail below, the nozzle component 40 may be separate from (i.e., not integral with) the nozzle block 34.

The nozzle 42 has a geometrical configuration. The geometrical configuration may be a converging-type configuration, a diverging-type configuration, or a de Laval (converging-diverging-type) configuration. Typically, the geometrical configuration is a de Laval configuration as shown in FIGS. 5 and 6A.

Figure 7B:
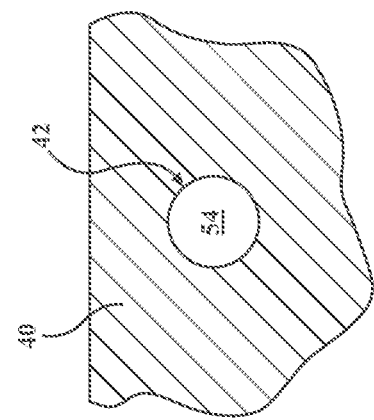
FIG. 7B is a cross-sectional view of a second throat section of the second nozzle taken along line 7B-7B in FIG. 6B.
Figure 7D:
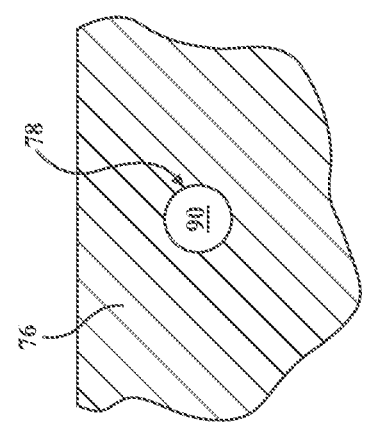
FIG. 7D is a cross-sectional view of a fourth throat section of the fourth nozzle taken along line 7D-7D in FIG. 6D.
Figure 7A:
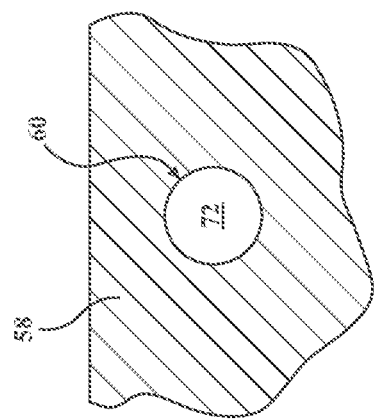
FIG. 7A is a cross-sectional view of a first throat section of the first nozzle taken along line 7A-7A in FIG. 6A.

As best shown in FIG. 6A, when the geometrical configuration of the nozzle 42 is a de Laval configuration, the nozzle 42 may have a working fluid inlet 44, a converging section 46, a diverging section 48, a throat section 50 separating the converging section 46 from the diverging section 48, and a working fluid outlet 52. When present, the converging section 46 extends from the working fluid inlet 44 to the throat section 50. When the converging section 46 is present, the cross-sectional area of the nozzle 42 gradually decreases from the working fluid inlet 44 to the throat section 50. When present, the diverging section 48 extends from the throat section 50 to the working fluid outlet 52. When the diverging section 48 is present, the cross-sectional area of the nozzle 42 gradually increases from the throat section 50 to the working fluid outlet 52. When present, the throat section 50 is where the cross-sectional area of the nozzle 42 is at a minimum. In the context of this disclosure, the minimum cross-sectional area of the nozzle 42 is referred to as the throat cross-sectional area 54, as best shown in FIG. 7A.

The working fluid passes through the converging section 46 of the nozzle 42 to the throat section 50. If the working fluid has a suitable pressure and mass flow rate, the working fluid velocity is choked at the throat section 50. Whether the working fluid is of a suitable pressure and mass flow rate for the working fluid velocity to be choked at the throat section 50 is based on the throat cross-sectional area 54. The working fluid is then expanded in the diverging section 48 such that the working fluid velocity is increased to a supersonic velocity. In this manner, the nozzle 42 accelerates the working fluid to supersonic velocities.

Figure 8:
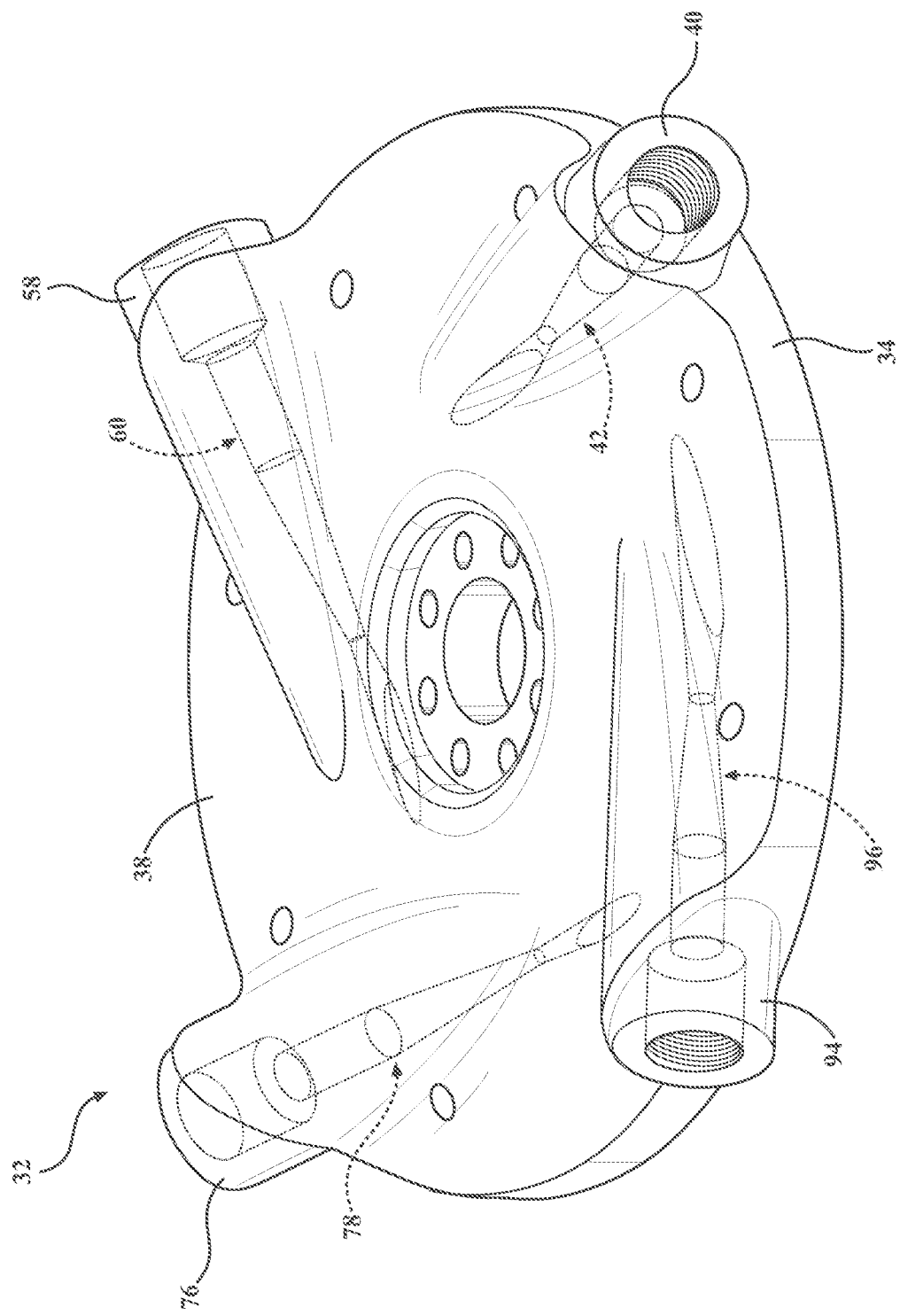
FIG. 8 is a perspective view of an alternative embodiment of the nozzle assembly of FIGS. 2-5 with the nozzle block defining a first bore, a second bore, a third bore, and a fourth bore, with the first, second, third, and fourth nozzle components being removably coupled to the nozzle block, with the first, second, third, and fourth nozzles shown in phantom, and with the first, second, third, and fourth nozzle components disposed in the first, second, third, and fourth bores respectively.
Figure 9:
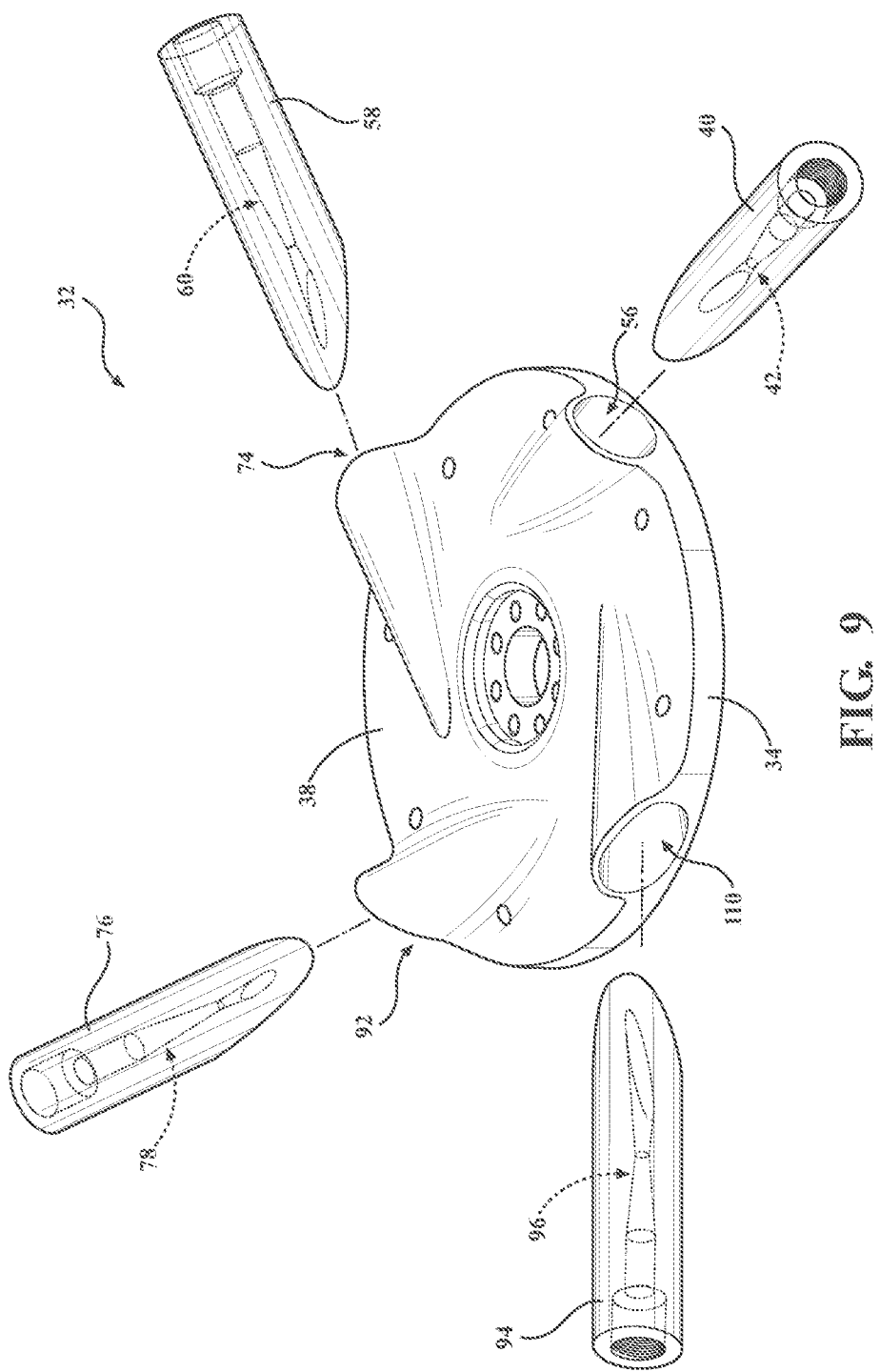
FIG. 9 is a perspective view of the nozzle assembly of FIG. 8 with the first, second, third, and fourth nozzle components removed from the first, second, third, and fourth bores respectively.

As described above, the nozzle component 40 may be integral with the nozzle block 34. In other embodiments, the nozzle component 40 may be fixed to the nozzle block 34, for example, by welding. As shown in FIGS. 8 and 9, the nozzle component 40 may be removably coupled to the nozzle block 34. When the nozzle component 40 is removably coupled to the nozzle block 34, the nozzle block 34 may define a bore 56 for selectively receiving the nozzle component 40. In this manner, the nozzle component 40 may be selectively disposed in the bore 56. Advantageously, when the nozzle component 40 is removably coupled to the nozzle block 34, manufacturing complexity of the waste heat recovery system 20 is reduced. Specifically, the nozzle 42 of the nozzle component 40 may be machined and/or cast independently of the nozzle block 34, thereby reducing manufacturing time and manufacturing costs. The removably coupled nozzle component 40 also allows for greater customizability of the waste heat recovery system 20 due to the interchangeability of the nozzle component 40.

When the nozzle component 40 is removably coupled to the nozzle block 34, the nozzle component may include screw threads. The nozzle block 34 may also include screw threads so that the nozzle component may be removably coupled to the nozzle block 34. In other embodiments, the nozzle component 40 may be removably coupled to the nozzle block 34 by a transition or interference fit.

In some embodiments, when the nozzle component 40 is removably coupled to the nozzle block 34, at least a portion of the nozzle block 34 is disposed between the nozzle 42 and the turbine blade 28 as shown in FIGS. 8 and 9. In other embodiments, the nozzle block 34 is disposed entirely between the nozzle 42 and the turbine blade 28. In some embodiments, no portion of the nozzle block 34 is disposed between the nozzle 42 and the turbine blade 28.

The nozzle component 40 may be further defined as a first nozzle component 40, and the nozzle 42 may be further defined as a first nozzle 42. Moreover, each section of the nozzle 42 described above may be further defined as a first section (e.g. first throat section 50, first throat cross-sectional area 54, etc.).

Figure 6B:
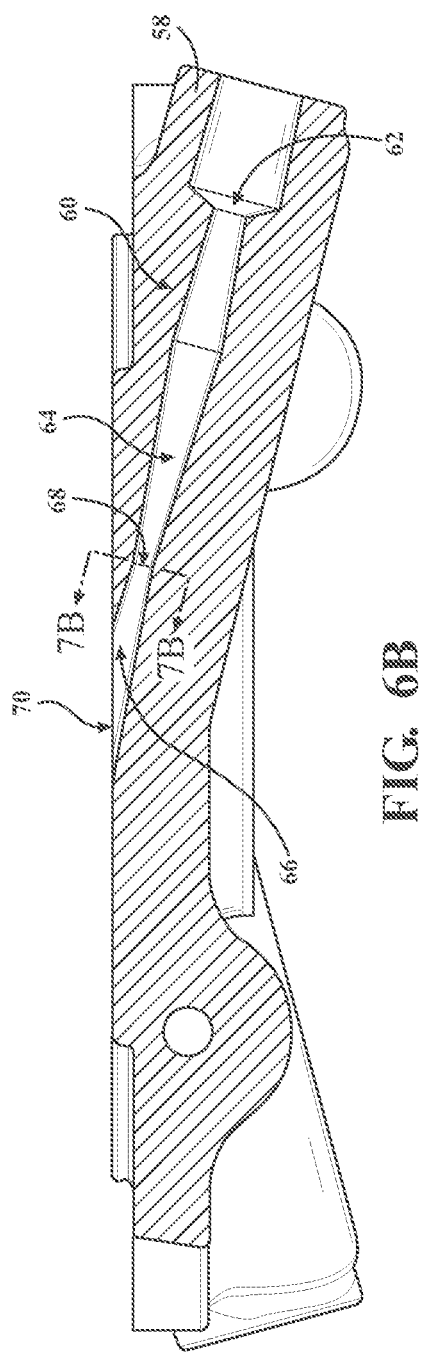
FIG. 6B is a cross-sectional view of the second nozzle component taken long line 6B-6B of FIG. 5.

With reference to FIG. 2, the nozzle assembly 32 may also include a second nozzle component 58 coupled to the nozzle block 34 for accelerating the working fluid. As shown in FIGS. 5 and 6B, when present, the second nozzle component 58 defines a second nozzle 60. In one embodiment, as best shown in FIG. 2, the second nozzle component 58 is integral (i.e., one-piece) with the nozzle block 34. In another embodiment, as described in further detail below, the second nozzle component 58 may be separate from (i.e., not integral with) the nozzle block 34.

The second nozzle 60 has a second geometrical configuration. The second geometrical configuration may be a converging-type configuration, a diverging-type configuration, or a de Laval (converging-diverging-type) configuration. Typically, the second geometrical configuration is a de Laval configuration as shown in FIGS. 5 and 6B. When the second geometrical configuration is a de Laval configuration, the second nozzle 60 may have a second working fluid inlet 62, a second converging section 64, a second diverging section 66, a second throat section 68 separating the second converging section 64 from the second diverging section 66, and a second working fluid outlet 70. As best seen in FIG. 7B, the minimum cross-sectional area of the second nozzle 60 is referred to as the second throat cross-sectional area 72. It is to be appreciated that the description of the first working fluid inlet 44, the first converging section 46, the first diverging section 48, the first throat section 50, and the first working fluid outlet 52 also applies to the second working fluid inlet 62, the second converging section 64, the second diverging section 66, the second throat section 68, and the second working fluid outlet 70.

In one embodiment, the second geometrical configuration of the second nozzle 60, when present, is different from the first geometrical configuration of the first nozzle 42. In some embodiments, the first and second geometrical configurations may be different types of configurations. For example, the first geometrical configuration may be a converging-type configuration and the second geometrical configuration may be a de Laval configuration. In other embodiments, as shown in FIG. 5, the first and second geometrical configurations may be the same type of configuration but have corresponding sections that differ from each other. For example, when the first and second geometrical configurations are de Laval configurations, at least one of the first working fluid inlet 44, first converging section 46, first throat section 50, first diverging section 48, and first working fluid outlet 52 of the first nozzle 42 is different from the corresponding second working fluid inlet 62, second converging section 64, second throat section 68, second diverging section 66, and second working fluid outlet 70 of the second nozzle 60.

In some embodiments, when the first and second geometrical configurations are de Laval configurations, the second throat cross-sectional area 72 is different from the first throat cross-sectional area 54, as shown in FIGS. 7A and 7B. As described above, whether the velocity of the working fluid is choked at the first and second throat sections 50, 68 is determined by the first and second throat cross-sectional areas 54, 72 and the working fluid pressure and mass flow rate. Because the first and second throat cross-sectional areas 54, 72 are different, the working fluid pressure and mass flow rate may be suitable for one of the first and second nozzles 42, 60 to accelerate the working fluid to a supersonic velocity and not the other of the first and second nozzles 42, 60. Moreover, during operation of the ICE, heat recovered by the waste heat recovery system 20 may change the working fluid pressure and mass flow rate such that both the first and second nozzles 42, 60 may accelerate the working fluid to a supersonic velocity. In this manner, the first and second nozzles 42, 60 expand the operating range of the waste heat recovery system 20. Specifically, the first and second nozzles 42, 60 expand the range of working fluid mass flow rates that the waste heat recovery system 20 may be operated at for a specific working fluid pressure. This advantageously allows the waste heat recovery system 20 to retain maximum cycle efficiency and power output for a broader range of ICE operating states, as described in further detail below.

As shown in FIG. 2 and described above, the second nozzle component 58 may be integral with the nozzle block 34. In other embodiments, the second nozzle component 58 may be fixed to the nozzle block 34, for example, by welding. As shown in FIGS. 8 and 9, in still other embodiments, the second nozzle component 58 may be removably coupled to the nozzle block 34. When the second nozzle component 58 is removably coupled to the nozzle block 34, the nozzle block may define a second bore 74 for selectively receiving the second nozzle component 58. In this manner, the second nozzle component 58 may be selectively disposed in the second bore 74.

When the second nozzle component 58 is removably coupled to the nozzle block 34, the second nozzle component may include screw threads. The nozzle block 34 may also include screw threads so that the second nozzle component 58 may be removably coupled to the nozzle block 34. In other embodiments, the second nozzle component 58 may be removably coupled to the nozzle block 34 by a transition or interference fit.

In some embodiments, when the second nozzle component 58 is removably coupled to the nozzle block 34, at least a portion of the nozzle block 34 is disposed between the second nozzle 60 and the turbine blade 28 as shown in FIGS. 8 and 9. In other embodiments, the nozzle block 34 is disposed entirely between the second nozzle 60 and the turbine blade 28. In some embodiments, no portion of the nozzle block 34 is disposed between the second nozzle 60 and the turbine blade 28.

In some embodiments, the first and second nozzle components 42, 60 may be circumferentially spaced about the longitudinal axis A. In other embodiments, the first and second nozzle components 42, 60 may be spaced equally and circumferentially about the longitudinal axis A.

With reference again to FIG. 2, the nozzle assembly 32 may also include a third nozzle component 76 coupled to the nozzle block 34 for accelerating the working fluid. When present, the third nozzle component 76 defines a third nozzle 78. In one embodiment, as best shown in FIG. 2, the third nozzle component 76 is integral (i.e., one-piece) with the nozzle block 34. In another embodiment, as described in further detail below, the third nozzle component 76 may be separate from (i.e., not integral with) the nozzle block 34.

Figure 6C:
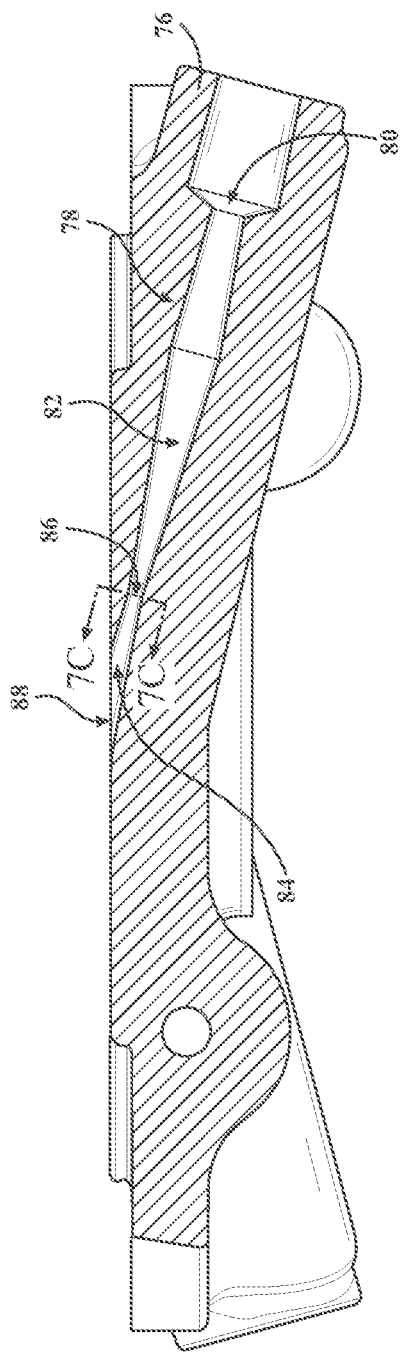
FIG. 6C is a cross-sectional view of the third nozzle component taken along line 6C-6C of FIG. 5.
Figure 7C:
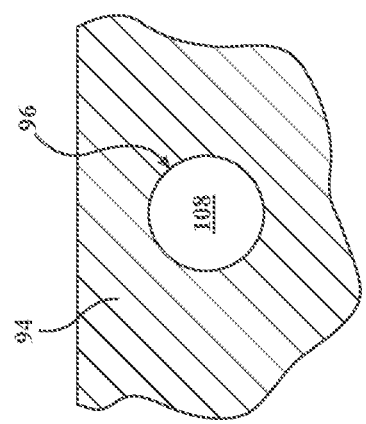
FIG. 7C is a cross-sectional view of a third throat section of the third nozzle taken along line 7C-7C in FIG. 6C.

The third nozzle 78 has a third geometrical configuration. The third geometrical configuration may be a converging-type configuration, a diverging-type configuration, or a de Laval (converging-diverging-type) configuration. Typically, the third geometrical configuration is a de Laval configuration as shown in FIGS. 5 and 6C. When the third geometrical configuration is a de Laval configuration, the third nozzle 78 may have a third working fluid inlet 80, a third converging section 82, a third diverging section 84, a third throat section 86 separating the third converging section 82 from the third diverging section 84, and a third working fluid outlet 88. As shown in FIG. 7C, the minimum cross-sectional area of the third nozzle 78 is referred to as the third throat cross-sectional area 90. It is to be appreciated that the description of the first working fluid inlet 44, the first converging section 46, the first diverging section 48, the first throat section 50, and the first working fluid outlet 52 also applies to the third working fluid inlet 80, the third converging section 82, the third diverging section 84, the third throat section 86, and the third working fluid outlet 88.

The third geometrical configuration of the third nozzle 78, when present, is different from at least one of the first and second geometrical configurations of the first and second nozzles 42, 60. In some embodiments, the third geometrical configuration may be a different type of configuration to at least one of the first and second geometrical configurations. For example, the first geometrical configuration may be a converging-type configuration, the second geometrical configuration may be a de Laval configuration, and the third geometrical configuration may be a de Laval configuration. In other embodiments, as shown in FIG. 5, the first, second, and third geometrical configurations may be the same type of configuration but have corresponding sections that differ from each other. For example, when the first, second, and third geometrical configurations are de Laval configurations, at least one of the third working fluid inlet 80, third converging section 82, third diverging section 84, third throat section 86, third diverging section 84 and third working fluid outlet 88 of the third nozzle 78 is different from the corresponding first working fluid inlet 44, first converging section 46, first diverging section 48, first throat section 50, and first working fluid outlet 52 of the first nozzle 42 and/or the second working fluid inlet 62, second converging section 64, second diverging section 66, second throat section 68, and second working fluid outlet 70 of the second nozzle 60.

In some embodiments, when the first, second, and third geometrical configurations are de Laval configurations, the third throat cross-sectional area 90 is different from at least one of first and second throat cross-sectional areas 54, 72. In other embodiments, when the first, second, and third geometrical configurations are de Laval configurations, the first, second, and third throat cross-sectional areas 54, 72, 90 are different from each other as shown in FIGS. 7A-C.

When the geometrical configurations of the nozzles are different from each other, the number of combinations of nozzles that the working fluid may pass through prior to rotating the turbine blade 28 is $2^n-1$, wherein n is the number of nozzles included in the nozzle assembly 32.

When the first, second, and third geometrical configurations are different from each other, the working fluid my pass through seven different combinations of the first, second, and third nozzles 42, 60, 78 prior to rotating the turbine blade 28 based on the working fluid pressure and mass flow rate. Specifically, the working fluid may pass through the first nozzle 42 alone, the second nozzle 60 alone, the third nozzle 78 alone, the first and second nozzles 42, 60 alone, the first and third nozzles 42, 78 alone, the second and third nozzles 60, 78 alone, and the first, second, and third nozzles 42, 60, 78.

When the first, second, and third geometrical configurations are de Laval configurations and the first, second, and third throat cross-sectional areas 54, 72, 90 are different from each other, whether the velocity of the working fluid is choked at the first, second and third throat sections 50, 68, 86 is determined by the first, second, and third throat cross-sectional areas 54, 72, 90 and the working fluid pressure and mass flow rate, as described above. Because the first, second, and third throat cross-sectional areas 54, 72, 90 are different, the working fluid pressure and mass flow rate may be suitable for one of first, second, and third nozzles 42, 60, 78 to accelerate the working fluid to a supersonic velocity and not the other of the first, second, and third nozzles 42, 60, 78. Moreover, during operation of the ICE, heat recovered by the waste heat recovery system 20 may change the working fluid pressure and mass flow rate such that different combinations of the first, second, and third nozzles 42, 60, 78 may accelerate the working fluid to a supersonic velocity. In this manner, the first second, and third nozzles 42, 60, 78 expand the operating range of the waste heat recovery system 20. Specifically, the first, second, and third nozzles 42, 60, 78 expand the range of working fluid mass flow rates that the waste heat recovery system 20 may be operated at for a specific working fluid pressure. This advantageously allows the waste heat recovery system 20 to retain maximum cycle efficiency and power output for a broader range of ICE operating states, as described in further detail below.

As shown in FIG. 2 and described above, the third nozzle component 76 may be integral with the nozzle block 34. In other embodiments, the third nozzle component 76 may be fixed to the nozzle block 34, for example, by welding. As shown in FIGS. 8 and 9, in still other embodiments, the third nozzle component 76 may be removably coupled to the nozzle block 34. When the third nozzle component 76 is removably coupled to the nozzle block 34, the nozzle block may define a third bore 92 for selectively receiving the third nozzle component 76. In this manner, the third nozzle component 76 may be selectively disposed in the third bore 92.

When the third nozzle component 76 is removably coupled to the nozzle block 34, the third nozzle component 76 may include screw threads. The nozzle block 34 may also include screw threads so that the third nozzle component 76 may be removably coupled to the nozzle block 34. In other embodiments, the third nozzle component 76 may be removably coupled to the nozzle block 34 by a transition or interference fit.

In some embodiments, when the third nozzle component 76 is removably coupled to the nozzle block 34, at least a portion of the nozzle block 34 is disposed between the third nozzle 78 and the turbine blade 28 as shown in FIGS. 8 and 9. In other embodiments, the nozzle block 34 is disposed entirely between the third nozzle 78 and the turbine blade 28. In some embodiments, no portion of the nozzle block 34 is disposed between the third nozzle 78 and the turbine blade 28.

In some embodiments, the first, second, and third nozzle components 40, 58, 76 may be circumferentially spaced about the longitudinal axis A. In other embodiments, the first, second, and third nozzle components 40, 58, 76 may be spaced equally and circumferentially about the longitudinal axis A.

With reference again to FIG. 2, the nozzle assembly 32 may also include a fourth nozzle component 94 coupled to the nozzle block 34 for accelerating the working fluid. When present, the fourth nozzle component 94 defines a fourth nozzle 96. In one embodiment, as best shown in FIG. 2, the fourth nozzle component 94 is integral (i.e., one-piece) with the nozzle block 34. In another embodiment, as described in further detail below, the fourth nozzle component 94 may be separate from (i.e., not integral with) the nozzle block 34.

Figure 6D:
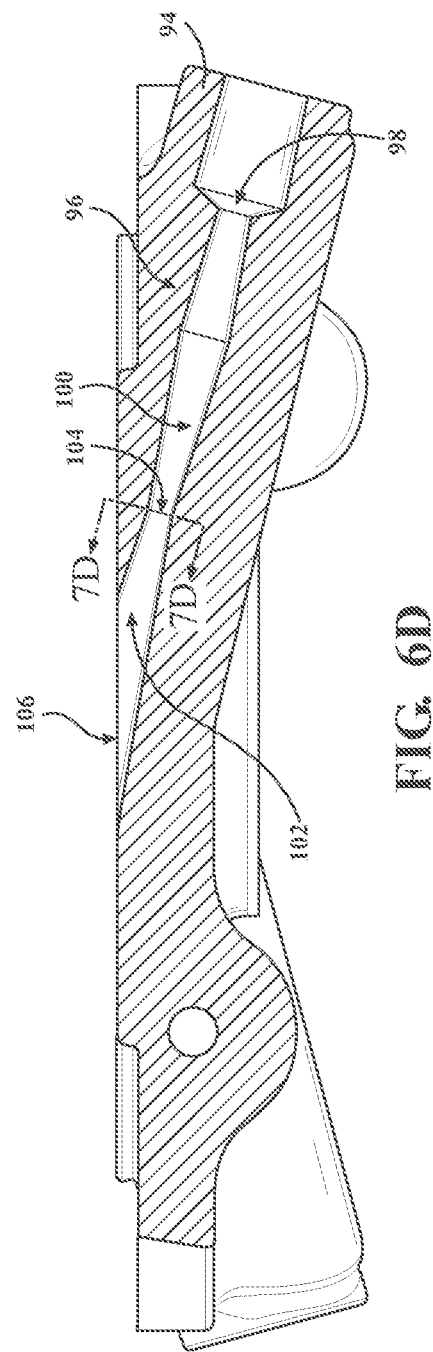
FIG. 6D is a cross-sectional view of the fourth nozzle component taken along line 6D-6D of FIG. 5.

The fourth nozzle 96 has a fourth geometrical configuration. The fourth geometrical configuration may be a converging-type configuration, a diverging-type configuration, or a de Laval (converging-diverging-type) configuration. Typically, the fourth geometrical configuration is a de Laval configuration as shown in FIGS. 5 and 6D. When the fourth geometrical configuration is a de Laval configuration, the fourth nozzle 96 may have a fourth working fluid inlet 98, a fourth converging section 100, a fourth diverging section 102, a fourth throat section 104 separating the fourth converging section 100 from the fourth diverging section 102, and a fourth working fluid outlet 106. As shown in FIG. 7C, the minimum cross-sectional area of the fourth nozzle 96 is referred to as the fourth throat cross-sectional area 108. It is to be appreciated that the description of the first working fluid inlet 44, the first converging section 46, the first diverging section 48, the first throat section 50, and the first working fluid outlet 52 also applies to the fourth working fluid inlet 98, the fourth converging section 100, the fourth diverging section 102, the fourth throat section 104, and the fourth working fluid outlet 106.

The fourth geometrical configuration of the fourth nozzle 96, when present, is different from at least one of the first, second, and third geometrical configurations of the first, second, and third nozzles 42, 60, 78. In some embodiments, the fourth geometrical configuration may be a different type of configuration to at least one of the first, second, and third geometrical configurations. For example, the first geometrical configuration may be a converging-type configuration, the second geometrical configuration may be a de Laval configuration, the third geometrical configuration may be a de Laval configuration, and the fourth geometrical configuration may be a diverging-type configuration. In other embodiments, as shown in FIG. 5, the first, second, third geometrical, and fourth configurations may be the same type of configuration but have corresponding sections that differ from each other. For example, when the first, second, third, and fourth geometrical configurations are de Laval configurations, at least one of the fourth working fluid inlet 98, fourth converging section 100, fourth diverging section 102, fourth throat section 104, and fourth working fluid outlet 106 of the fourth nozzle 96 is different from the corresponding first working fluid inlet 44, first converging section 46, first diverging section 48, first throat section 50, and first working fluid outlet 52 of the first nozzle 42, the second working fluid inlet 62, second converging section 64, second diverging section 66, second throat section 68, and second working fluid outlet 70 of the second nozzle 60, and/or the third working fluid inlet 80, third converging section 82, third diverging section 84, third throat section 86, and third working fluid outlet 88 of the third nozzle 78.

In some embodiments, when the first, second, third, and fourth geometrical configurations are de Laval configurations, the fourth throat cross-sectional area 108 is different from at least one of first, second, and third throat cross-sectional areas 54, 72, 90. In other embodiments, when the first, second, third, and fourth geometrical configurations are de Laval configurations, the first, second, third, and fourth throat cross-sectional areas 54, 72, 90, 108 are different from each other as shown in FIGS. 7A-D.

When the first, second, third, and fourth geometrical configurations are different from each other, the working fluid my pass through fifteen different combinations of the first, second, third, and fourth nozzles 42, 60, 78, 96 prior to rotating the turbine blade 28 based on the working fluid pressure and mass flow rate. Specifically, the working fluid may pass through the first nozzle 42 alone, the second nozzle 60 alone, the third nozzle 78 alone, the fourth nozzle 96 alone, the first and second nozzles alone 42, 60, the first and third nozzles alone 42, 78, the first and fourth nozzles 42, 96 alone, the second and third nozzles alone 60, 78, the second and fourth nozzles alone 60, 96, the third and fourth nozzles 78, 96 alone, the first, second, and third nozzles 42, 60, 78 alone, the first, second, and fourth nozzles 42, 60, 96 alone, the first, third, and fourth nozzles 42, 78, 96 alone, the second, third, and fourth nozzles 60, 78, 96 alone, and the first, second, third, and fourth nozzles 42, 60, 78, 96.

When the first, second, third, and fourth geometrical configurations are de Laval configurations and the first, second, third, and fourth throat cross-sectional areas 54, 72, 90, 108 are different from each other, whether the velocity of the working fluid is choked at the first, second, third, and fourth throat sections 50, 68, 86, 104 is determined by the first, second, third and fourth throat cross-sectional areas 54, 72, 90, 108 and the working fluid pressure and mass flow rate, as described above. Because the first, second, third, and fourth throat cross-sectional areas 54, 72, 90, 108 are different, the working fluid pressure and mass flow rate may be suitable for one of first, second, third, and fourth nozzles 54, 72, 90, 108 to accelerate the working fluid to a supersonic velocity and not the other of the first, second, third, and fourth nozzles 54, 72, 90, 108. Moreover, during operation of the ICE, heat recovered by the waste heat recovery system 20 may change the working fluid pressure and mass flow rate such that different combinations of the first, second, third, and fourth nozzles 42, 60, 78, 96 may accelerate the working fluid to a supersonic velocity. In this manner, the first second, third, and fourth nozzles 42, 60, 78, 96 expand the operating range of the waste heat recovery system 20. Specifically, the first, second, third, and fourth nozzles 42, 60, 78, 96 expand the range of working fluid mass flow rates that the waste heat recovery system 20 may be operated at for a specific working fluid pressure. This advantageously allows the waste heat recovery system 20 to retain maximum cycle efficiency and power output for a broader range of ICE operating states, as described in further detail below.

As shown in FIG. 2 and described above, the fourth nozzle component 94 may be integral with the nozzle block 34. In other embodiments, the fourth nozzle component 94 may be fixed to the nozzle block 34, for example, by welding. As shown in FIGS. 8 and 9, in still other embodiments, the third nozzle component 76 may be removably coupled to the nozzle block 34. When the fourth nozzle component 94 is removably coupled to the nozzle block 34, the nozzle block 34 may define a fourth bore 110 for selectively receiving the third nozzle component 76. In this manner, the fourth nozzle component 94 may be selectively disposed in the fourth bore 110.

When the fourth nozzle component 94 is removably coupled to the nozzle block 34, the fourth nozzle component 94 may include screw threads. The nozzle block 34 may also include screw threads so that the fourth nozzle component 94 may be removably coupled to the nozzle block 34. In other embodiments, the fourth nozzle component 94 may be removably coupled to the nozzle block 34 by a transition or interference fit.

In some embodiments, when the fourth nozzle component 94 is removably coupled to the nozzle block 34, at least a portion of the nozzle block 34 is disposed between the fourth nozzle 96 and the turbine blade 28 as shown in FIGS. 8 and 9. In other embodiments, the nozzle block 34 is disposed entirely between the fourth nozzle 96 and the turbine blade 28. In some embodiments, no portion of the nozzle block 34 is disposed between the fourth nozzle 96 and the turbine blade 28.

In some embodiments, the first, second, third nozzle, and fourth nozzle components 40, 58, 76, 94 may be circumferentially spaced about the longitudinal axis A. In other embodiments, as shown in FIG. 4, the first, second, third, and fourth nozzle components 40, 58, 76, 94 may be spaced equally and circumferentially about the longitudinal axis A.

It is to be appreciated that the nozzle assembly 32 may further include any number of additional nozzle components and that the description regarding the first nozzle component 40 is applicable to any additional nozzle component. It is to be further appreciated that any geometrical configuration of any nozzle defined by the additional nozzle components will be different from at least one of the nozzles included in the nozzle assembly. In this manner, the operating range of the waste heat recovery system 20 can be expanded even further by the inclusion of additional nozzle components beyond the first, second, third, and/or fourth nozzle components 40, 58, 76, 94 described herein. For example, the nozzle assembly 32 may include five, six, seven, or eight nozzle components. However, it is to be appreciated that the nozzle assembly 32 may have more than eight nozzle components.

As shown in FIGS. 2 and 3, the turbine expander 22 may include a turbine housing 112. When the turbine housing 112 is present, the turbine blade 28 may be disposed in the turbine housing 112.

With reference again to FIG. 1, the waste heat recovery system 20 includes the flow control device 24 in fluid communication with the turbine expander 22 for directing the working fluid to at least one of the first, second, third, and/or fourth nozzles 42, 60, 78, 96 included in the turbine expander 22, or to bypass the turbine expander 22. The flow control device 24 may be a valve, or any other suitable working fluid flow control device. The flow control device 24 is typically disposed upstream of the turbine expander 22.

In some embodiments, the flow control device 24 may include a plurality of valves corresponding to each nozzle included in the turbine expander 22. For example, if the turbine expander 22 includes two nozzles, the flow control device 24 includes two valves. Each valve may be movable between an open position where the working fluid can flow to the corresponding nozzle, and a closed position where the working fluid is restricted from flowing to the corresponding nozzle. When the flow control device 24 includes a plurality of valves corresponding to each nozzle included in the turbine expander, the flow control device 24 may also include a bypass valve that causes the working fluid to bypass the turbine expander 22. In other embodiments, the flow control device may include a switching valve adapted to selectively direct working fluid to one or more of the nozzles included in the turbine expander 22, or to bypass the turbine expander 22. It is to be appreciated that any valves of the flow control device 24 may be movable between a closed position, an open position, and an intermediate position in which flow of the working fluid is metered.

With continued reference to FIG. 1, the waste heat recovery system 20 includes the controller 26 in communication with the flow control device 24 and adapted to control the flow control device 24 to direct the working fluid to at least one of the first, second, third, and/or fourth nozzles 42, 60, 78, 96 included in the turbine expander 22, or to bypass the turbine expander 22.

The controller 26 may include one or more processors, or microprocessors, for processing instructions stored in memory to control operation of the flow control device 24. Such instructions may be any of the functions, algorithms or techniques described herein performed by the controller 26. Additionally or alternatively, the controller 26 may comprise one or more microcontrollers, field programmable gate arrays, systems on a chip, discrete circuitry, and/or other suitable hardware, software, or firmware that is capable of carrying out the functions described herein.

Typically, the working fluid is an organic, high molecular mass working fluid with a liquid-vapor phase change occurring at a lower temperature than a water-steam phase change. The working fluid may include at least one of ethanol, methanol, kerosene, gasoline, diesel, propanol, butanol, water, benzene, toluene, methane, ethane, propane, butane, acetone, or liquid hydrogen. During operation of the waste heat recovery system, the working fluid is in one of a liquid state or a vapor state. In the vapor state, the working fluid is more suitable for rotating the turbine blade.

As shown in FIG. 1, the waste heat recovery system 20 may also include an evaporator 114 in fluid communication with the flow control device 24 and the turbine expander 22. The evaporator 114 transfers heat discarded by the ICE to the working fluid, thereby causing the working fluid to phase change from the liquid state to the vapor state. When present, the evaporator 114 is disposed upstream of the flow control device 24.

The waste heat recovery system 20 may also include a condenser 116 in fluid communication with the turbine expander 22 and the flow control device 24. The condenser 116 condenses the working fluid from the vapor state to the liquid state after the working fluid passes through the turbine expander 22. The condenser 116 is disposed downstream of the turbine expander 22. In some embodiments, when the waste heat recovery system 20 includes the evaporator 114, the condenser 116 is disposed downstream of the turbine expander 22 and upstream of the evaporator 114.

The waste heat recovery system 20 may further include at least one sensor 118 in communication with the controller 26. The at least one sensor 118 is adapted to detect a characteristic of the working fluid. When present, the at least one sensor 118 is disposed upstream of the flow control device 24 and the turbine expander 22 such that the at least one sensor 118 may detect the characteristic of the working fluid prior to the working fluid passing through the flow control device 24. As shown in FIG. 1, when the evaporator 114 is included in the waste heat recovery system 20, the at least one sensor 118 is disposed upstream of the flow control device 24 and downstream of the evaporator 114. However, the at least one sensor 118 may be disposed upstream of the evaporator 114 or at any other location suitable for detecting the characteristic of the working fluid. The at least one sensor 118 is further adapted to send a signal to the controller 26 indicative of the characteristic of the working fluid detected by the at least one sensor 118. The characteristic of the working fluid detected by the at least one sensor 118 may be the working fluid pressure, the working fluid mass flow rate, the working fluid temperature, working fluid quality, and combinations thereof. In some embodiments, the at least one sensor 118 detects the working fluid temperature and the working fluid pressure.

In some embodiments the at least one sensor 118 may be two sensors. When the at least one sensor 118 is two sensors, each sensor may detect one of the characteristics of the working fluid described above. Alternatively, each sensor may detect a combination of the characteristics of the working fluid described above. In some embodiments, one sensor detects working fluid temperature and the other sensor detects working fluid pressure.

To ensure maximum cycle efficiency and power output of the waste heat recovery system 20, the combination of first, second, third, and/or fourth nozzles 42, 60, 78, 96, that the working fluid passes through prior to rotating the turbine blade 28 is based on a function of the working fluid pressure and working fluid mass flow rate. As described above, heat discarded by the ICE is recovered by the waste heat recovery system 20 to heat the working fluid so that the working fluid undergoes liquid-vapor phase change. Heat discarded by the ICE varies based on the speed and load (i.e., operating state) of the ICE. As such, at certain operating states of the ICE (e.g. start-up, acceleration, etc.), heat discarded by the ICE and recovered by the waste heat recovery system 20 may render the working fluid pressure unsuitable for one or more of the first, second, third, and/or fourth nozzles 42, 60, 78, 96 if maximum cycle efficiency and power output of the waste heat recovery system 20 is to be maintained. As will be described below, the at least one sensor 118 communicates with the controller 26 to direct fluid to at least one of the first, second, third, and/or fourth nozzles 42, 60, 78, 96 included in the turbine expander 22 to ensure maximum cycle efficiency and power output of the waste heat recovery system 20 across a broader range of operating states of the ICE.

When the at least one sensor 118 is included in the waste heat recovery system 20, the controller 26 may be adapted to control the flow control device 24 to direct the working fluid to at least one of the first, second, third, and/or fourth nozzles 42, 60, 78, 96 included in the turbine expander 22 or to bypass the turbine expander 22 based on the characteristic of the working fluid detected by the at least one sensor 118. In one embodiment, when the controller 26 receives the signal indicative of the characteristic of the working fluid detected by the at least one sensor 118, the controller 26 may compare the detected characteristic of the working fluid with a threshold value corresponding to the geometrical configuration of each of the first, second, third, and/or fourth nozzles 42, 60, 78, 96 included in the turbine expander. After comparing the detected characteristic of the working fluid with the threshold value(s), the controller then controls the flow control device 24 to direct the working fluid to each of the first, second, third, and/or fourth nozzles 42, 60, 78, 96 for which the detected characteristic of the working fluid exceeds the corresponding threshold value(s). If the controller 26 determines that no corresponding threshold value(s) is(are) exceeded by the detected characteristic of the working fluid, then the controller 26 controls the flow control device 24 to direct the working fluid to bypass the turbine expander 22. In this manner, the different geometrical configurations of the first, second, third, and/or fourth nozzles 42, 60, 78, 96 advantageously expand the operating range of the waste heat recovery system 20 by accelerating the working fluid to supersonic velocities at a broader range of working fluid pressures, mass flow rates, temperatures, etc. Moreover, as the working fluid pressure and/or mass flow rate varies during operation of the ICE, the waste heat recovery system 20 advantageously allows for an incremental increase of working fluid flow to the turbine blade 28.

For example, during start-up of the ICE, the working fluid mass flow rate may be low to ensure maximum transfer of heat discarded by the ICE to the working fluid. To ensure maximum cycle efficiency and power output of the waste heat recovery system 20, the working fluid pressure will typically have a higher value than when the engine is in other operating states, such as a steady state operating state. Based on the higher value of the working fluid pressure, the controller 26 will control the flow control device 24 to direct the working fluid to at least one of the first, second, third, and/or fourth nozzles 42, 60, 78, 96 that has a small throat cross-sectional area.

In another example, during acceleration, heat discarded by the ICE is constantly varying. To ensure maximum cycle efficiency and power output of the waste heat recovery system 20, the controller 26 may control the flow control device 24 to direct the working fluid to one, two three, and/or four of the first, second, third, and/or fourth nozzles 42, 60, 78, 96 so that working fluid pressure remains relatively constant while heat discarded by the ICE varies. In other words, the number of nozzles that the working fluid is directed to may vary as heat discarded by the ICE varies.

In some embodiments, the at least one sensor 118 may be adapted to detect at least one of a working fluid temperature and a working fluid pressure of the working fluid upstream of the turbine expander 22. The controller 26 my control the flow control device 24 to direct the working fluid to at least one of the first, second, third, and/or fourth nozzles 42, 60, 78, 96 included in the turbine expander 22 or to bypass the turbine expander 22 based on at least one of the working fluid mass flow rate and the working fluid pressure detected by the at least one sensor 118.

With reference again to FIG. 1, the waste heat recovery system 20 may also include a working fluid circuit 120 for circulating the working fluid. The working fluid circuit 120 fluidly couples the turbine expander 22, the flow control device 24, the evaporator 114, and/or the condenser 116. The working fluid circuit 120 may include a plurality of fluid conduits.

Figure 10:
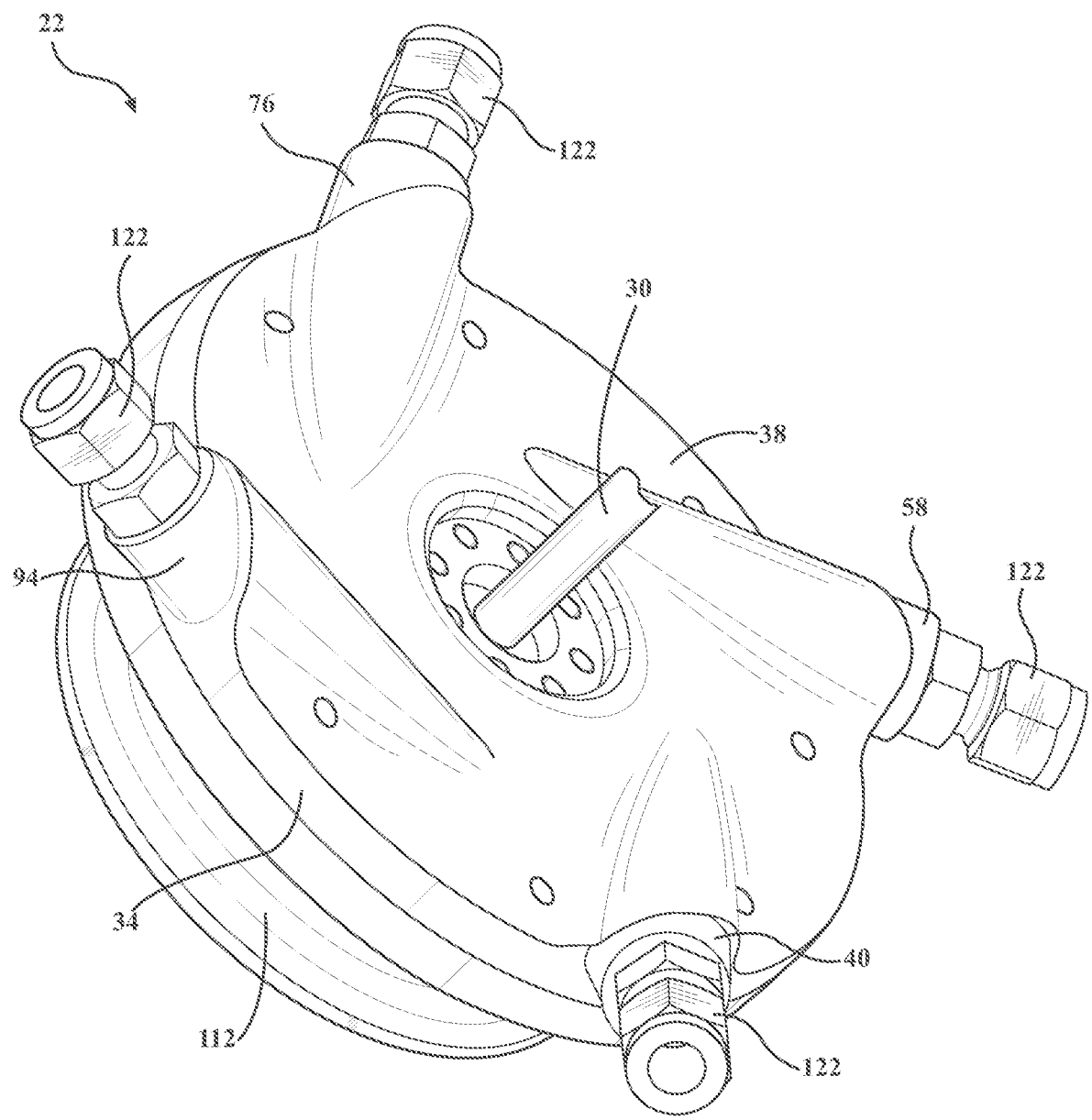
FIG. 10 is a perspective view of the turbine expander of FIG. 2 further including a plurality of fluid couplers coupled to the first, second, third, and fourth nozzle components.
Figure 11:
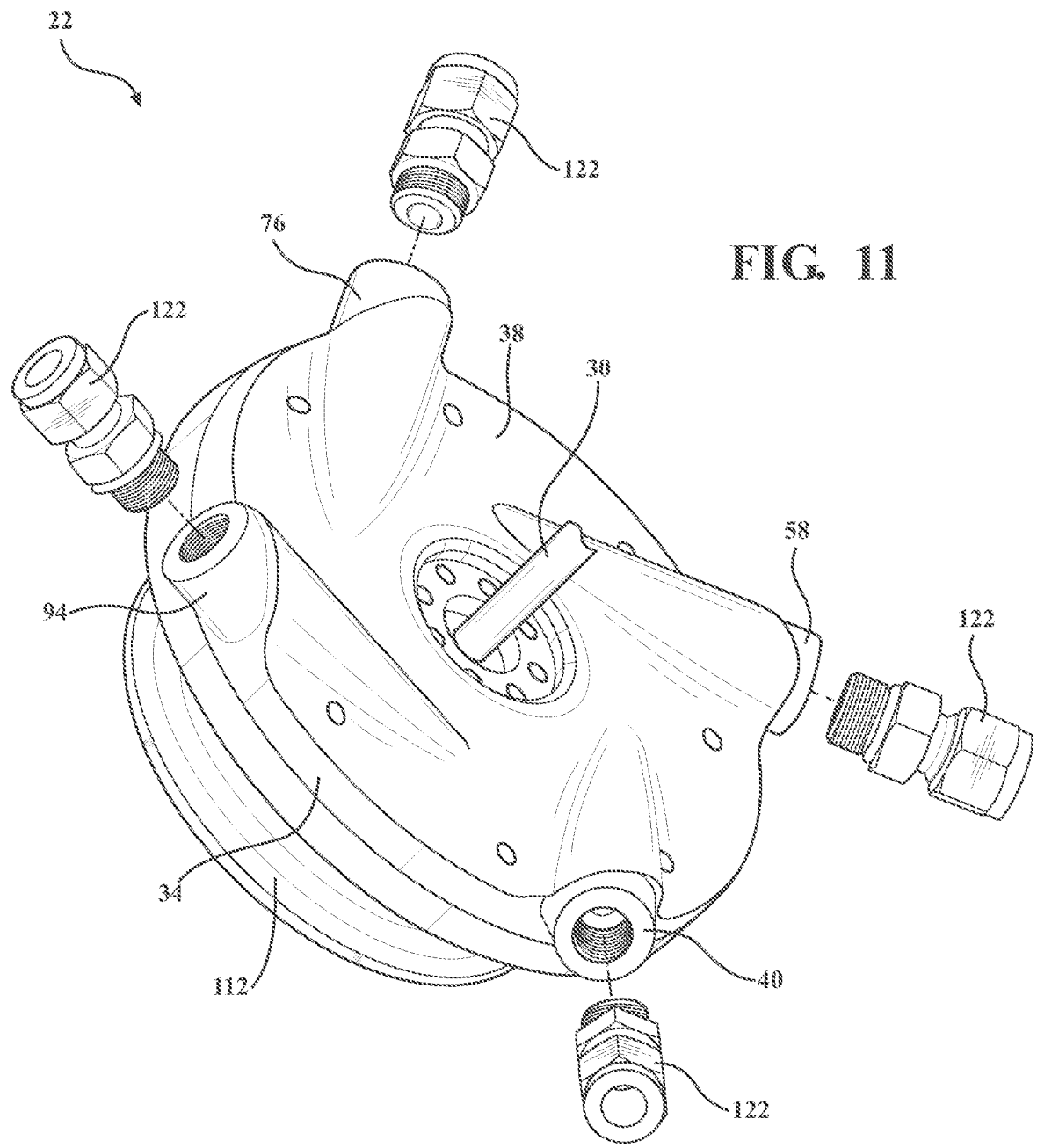
FIG. 11 is a perspective view of the turbine expander of FIG. 10 with the plurality of fluid coupled couplers removed from the first, second, third, and fourth nozzle components.

As shown in FIGS. 10 and 11, when the working fluid circuit 120 includes a plurality of fluid conduits, the turbine expander 22 may include one or more fluid couplers 122 to removably couple one of the fluid conduits to each of the first, second, third, and/or fourth nozzle components 40, 58, 76, 94 included in turbine expander 22.

In some embodiments, the working fluid circuit 120 may include a bypass loop that fluidly couples the flow control device 24 to the condenser 116 directly, thereby circumventing passage of the working fluid through the turbine expander 22.

With reference again to FIG. 1, the waste heat recovery system 20 may also include a pump 124 adapted to adjust the working fluid flow rate through the waste heat recovery system 20 at one or more speeds. The pump 124 may be any suitable pump, such as a piston pump or a diaphragm pump. In some embodiments, when the waste heat recovery system 20 includes the evaporator 114 and the condenser 116, the pump 124 may disposed upstream of the evaporator 114 and downstream of the condenser 116. In some embodiments, when the at least one sensor 118 is present, the pump 124 may be in communication with the controller 26 and the controller 26 may control the pump 124 to adjust the working fluid flow rate based on the characteristic of the working fluid detected by the at least one sensor 118.

A vehicle may include the waste heat recovery system 20 as described herein. In some embodiments, the shaft 30 of the turbine expander 22 may be coupled to a generator. When the shaft 30 is coupled to the generator, waste heat generated by the ICE may be converted to electric power that may be stored or used by the vehicle.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A waste heat recovery system for recovering waste heat of an internal combustion engine, said waste heat recovery system comprising:
   a turbine expander for outputting power based on a working fluid, said turbine expander comprising,
      a turbine blade rotatable by the working fluid,
      a shaft coupled to and rotatable by said turbine blade, with said shaft extending along a longitudinal axis, and
      a nozzle assembly for directing the working fluid to said turbine blade for rotating said turbine blade, said nozzle assembly comprising,
         a nozzle block disposed about said shaft and adjacent said turbine blade,
         a first nozzle component coupled to said nozzle block for accelerating the working fluid, with said nozzle component defining a first nozzle having a first geometrical configuration,
         a second nozzle component coupled to said nozzle block for accelerating the working fluid, with said second nozzle component defining a second nozzle having a second geometrical configuration that is different from said first geometrical configuration,
         a third nozzle component coupled to said nozzle block for accelerating the working fluid, with said third nozzle component defining a third nozzle having a third geometrical configuration that is different from at least one of said first and second geometrical configurations, and
         a fourth nozzle component coupled to said nozzle block for accelerating the working fluid, with said fourth nozzle component defining a fourth nozzle having a fourth geometrical configuration that is different from at least one of said first, second, and third geometrical configurations,
      wherein said first, second, third, and fourth nozzle components are spaced circumferentially about said longitudinal axis,
      wherein at least a portion of said nozzle block is disposed between any one of said first, second, third and fourth nozzles and said turbine blade;
   a flow control device in fluid communication with said turbine expander for directing the working fluid to at least one of said first and second nozzles or to bypass said turbine expander; and
   a controller in communication with said flow control device and adapted to control said flow control device to direct the working fluid to at least one of said first and second nozzles or to bypass said turbine expander.

2. The waste heat recovery system as set forth in claim 1, wherein said first geometrical configuration of said first nozzle is a de Laval configuration having a first throat cross-sectional area, and wherein said second geometrical configuration of said second nozzle is a de Laval configuration having a second throat cross-sectional area that is different from said first throat cross-sectional area.

3. The waste heat recovery system as set forth in claim 1, wherein a fifth nozzle component is coupled to said nozzle block for accelerating the working fluid, with said fifth nozzle component defining a fifth nozzle having a fifth geometrical configuration and wherein said first, second, third, fourth and fifth nozzle components are equally spaced circumferentially about said longitudinal axis.

4. The waste heat recovery system as set forth in claim 3, wherein a sixth nozzle component is coupled to said nozzle block for accelerating the working fluid, with said sixth nozzle component defining a sixth nozzle having a sixth geometrical configuration and wherein said first, second, third, fourth, fifth and sixth nozzle components are equally spaced circumferentially about said longitudinal axis.

5. The waste heat recovery system as set forth in claim 4, wherein each of a seventh nozzle component and an eighth nozzle component is coupled to said nozzle block for accelerating the working fluid, with said seventh nozzle component defining a seventh nozzle having a seventh geometrical configuration and with said eighth nozzle component defining an eighth nozzle having an eighth geometrical configuration and wherein said first, second, third, fourth, fifth, sixth, seventh and eighth nozzle components are equally spaced circumferentially about said longitudinal axis.

6. The waste heat recovery system as set forth in claim 1 further comprising at least one sensor adapted to detect at least one of a working fluid temperature and a working fluid pressure of the working fluid upstream of said turbine expander.

7. The waste heat recovery system as set forth in claim 6, wherein said controller controls said flow control device to direct the working fluid to at least one of said first and second nozzles or to bypass said turbine expander based on at least one of said working fluid temperature and said working fluid pressure detected by said at least one sensor.

8. The waste heat recovery system as set forth in claim 1, wherein said first and second nozzle components are integral with said nozzle block.

9. The waste heat recovery system as set forth in claim 1, wherein said nozzle block further defines a first bore and a second bore, wherein said first nozzle component is removably coupled to said nozzle block such that said first nozzle component is selectively disposed in said first bore, and wherein said second nozzle component is removably coupled to said nozzle block such that said second nozzle component is selectively disposed in said second bore.

10. A turbine expander for a waste heat recovery system for outputting power based on a working fluid, said turbine expander comprising:
  a turbine blade rotatable by the working fluid;
  a shaft coupled to and rotatable by said turbine blade, with said shaft extending along a longitudinal axis; and
  a nozzle assembly for directing the working fluid to said turbine blade for rotating said turbine blade, said nozzle assembly comprising,
    a nozzle block disposed about said shaft and adjacent said turbine blade,
    a first nozzle component coupled to said nozzle block for accelerating the working fluid, with said nozzle component defining a first nozzle having a first geometrical configuration,
    a second nozzle component coupled to said nozzle block for accelerating the working fluid, with said second nozzle component defining a second nozzle having a second geometrical configuration that is different from said first geometrical configuration,
    a third nozzle component coupled to said nozzle block for accelerating the working fluid, with said third nozzle component defining a third nozzle having a third geometrical configuration that is different from at least one of said first and second geometrical configurations, and
    a fourth nozzle component coupled to said nozzle block for accelerating the working fluid, with said fourth nozzle component defining a fourth nozzle having a fourth geometrical configuration that is different from at least one of said first, second, and third geometrical configurations,
    wherein said first, second, third, and fourth nozzle components are spaced circumferentially about said longitudinal axis,
    wherein at least a portion of said nozzle block is disposed between any one of said first, second, third and fourth nozzles and said turbine blade.

11. The turbine expander as set forth in claim 10, wherein said first geometrical configuration of said first nozzle is a de Laval configuration having a first throat cross-sectional area, and wherein said second geometrical configuration of said second nozzle is a de Laval configuration having a second throat cross-sectional area that is different from said first throat cross-sectional area.

12. The turbine expander as set forth in claim 10, wherein said first and second nozzle components are integral with said nozzle block.

13. The turbine expander as set forth in claim 10, wherein said first geometrical configuration of said first nozzle is a de Laval configuration having a first throat cross-sectional area, wherein said second geometrical configuration of said second nozzle is a de Laval configuration having a second throat cross-sectional area, wherein said third geometrical configuration of said third nozzle is a de Laval configuration having a third throat cross-sectional area, and wherein said fourth geometrical configuration is a de Laval configuration having a fourth throat cross-sectional area, and wherein each of said first, second, third, and fourth throat cross-sectional areas are different.

14. The turbine expander as set forth in claim 10, wherein a fifth nozzle component is coupled to said nozzle block for accelerating the working fluid, with said fifth nozzle component defining a fifth nozzle having a fifth geometrical configuration and wherein said first, second, third, fourth and fifth nozzle components are equally spaced circumferentially about said longitudinal axis.

15. The turbine expander as set forth in claim 14, wherein a sixth nozzle component is coupled to said nozzle block for accelerating the working fluid, with said sixth nozzle component defining a sixth nozzle having a sixth geometrical configuration and wherein said first, second, third, fourth, fifth and sixth nozzle components are equally spaced circumferentially about said longitudinal axis.

16. The turbine expander as set forth in claim 15, wherein each of a seventh nozzle component and an eighth nozzle component is coupled to said nozzle block for accelerating the working fluid, with said seventh nozzle component defining a seventh nozzle having a seventh geometrical configuration and with said eighth nozzle component defining an eighth nozzle having an eighth geometrical configuration and wherein said first, second, third, fourth, fifth, sixth, seventh and eighth nozzle components are equally spaced circumferentially about said longitudinal axis.

17. The turbine expander as set forth in claim 10, wherein said nozzle block further defines a first bore and a second bore, wherein said first nozzle component is removably coupled to said nozzle block such that said first nozzle component is selectively disposed in said first bore, and wherein said second nozzle component is removably coupled to said nozzle block such that said second nozzle component is selectively disposed in said second bore.

18. A waste heat recovery system for recovering waste heat of an internal combustion engine, said waste heat recovery system comprising:
   a turbine expander for outputting power based on a working fluid, said turbine expander comprising,
      a turbine blade rotatable by the working fluid,
      a shaft coupled to and rotatable by said turbine blade, with said shaft extending along a longitudinal axis, and
      a nozzle assembly for directing the working fluid to said turbine blade for rotating said turbine blade, said nozzle assembly comprising,
         a nozzle block disposed about said shaft and adjacent said turbine blade, with said nozzle block defining a bore, and
         a first nozzle component removably coupled to said nozzle block such that said nozzle component is selectively disposed in said bore for accelerating the working fluid, with said first nozzle component defining a first nozzle,
         a second nozzle component coupled to said nozzle block for accelerating the working fluid, with said second nozzle component defining a second nozzle,
         a third nozzle component coupled to said nozzle block for accelerating the working fluid, with said third nozzle component defining a third nozzle, and
         a fourth nozzle component coupled to said nozzle block for accelerating the working fluid, with said fourth nozzle component defining a fourth nozzle,
   wherein said first, second, third, and fourth nozzle components are spaced circumferentially about said longitudinal axis;
   a flow control device in fluid communication with said turbine expander for directing the working fluid to said nozzle or to bypass said turbine expander; and
   a controller in communication with said flow control device and adapted to control said flow control device to direct the working fluid to said nozzle or to bypass said turbine expander, wherein at least a portion of said nozzle block is disposed between said first nozzle and said turbine blade.

19. A turbine expander for a waste heat recovery system for outputting power based on a working fluid, said turbine expander comprising:
   a turbine blade rotatable by the working fluid;
   a shaft coupled to and rotatable by said turbine blade; and
   a nozzle assembly for directing the working fluid to said turbine blade for rotating said turbine blade, said nozzle assembly comprising,
      a nozzle block disposed about said shaft and adjacent said turbine blade, with said nozzle block defining a first bore, and
      a first nozzle component removably coupled to said nozzle block such that said nozzle component is selectively disposed in said bore for accelerating the working fluid, with said first nozzle component defining a first nozzle;
      a second nozzle component coupled to said nozzle block for accelerating the working fluid, with said second nozzle component defining a second nozzle,
      a third nozzle component coupled to said nozzle block for accelerating the working fluid, with said third nozzle component defining a third nozzle, and
      a fourth nozzle component coupled to said nozzle block for accelerating the working fluid, with said fourth nozzle component defining a fourth nozzle,
   wherein said first, second, third, and fourth nozzle components are spaced circumferentially about said longitudinal axis,
wherein at least a portion of said nozzle block is disposed between said first nozzle and said turbine blade.

* * * * *